US005582889A

United States Patent [19]

Pedrini

[11] Patent Number: 5,582,889

[45] Date of Patent: Dec. 10, 1996

[54] SELF-ADHESIVE LABEL FOR RECLOSING PACKETS

[75] Inventor: Maurizio Pedrini, Parma, Italy

[73] Assignee: Barilla G.eR.Ili-Societa per Azioni, Parma, Italy

[21] Appl. No.: 453,000

[22] Filed: May 30, 1995

[51] Int. Cl.$^{6}$ .................................. B32B 7/06; B32B 7/12

[52] U.S. Cl. ........................ 428/41.9; 428/42.3; 428/40.1; 428/136; 383/62; 383/81

[58] Field of Search ................................ 428/40, 42, 136; 383/62, 81, 78, 82, 83

[56] References Cited

U.S. PATENT DOCUMENTS

| | | | |
|---|---|---|---|
| 4,008,851 | 2/1977 | Hirsch | 383/62 |
| 4,795,669 | 1/1989 | Bowskill et al. | 428/40 |

FOREIGN PATENT DOCUMENTS

| | | | |
|---|---|---|---|
| 0302600A1 | 2/1989 | European Pat. Off. | B65D 33/16 |
| 0326139A3 | 8/1989 | European Pat. Off. | G09F 3/02 |
| 8713894 U | 1/1988 | Germany | B65D 33/16 |
| 2250501 | 6/1992 | United Kingdom | G09F 3/10 |

*Primary Examiner*—Alexander Thomas
*Attorney, Agent, or Firm*—Seed and Berry LLP

[57] ABSTRACT

A self-adhesive label (4) to reclose packets (1), that is usable on all types of packet (1) of the type specified with a paper surface, comprises a first layer (5), that has a permanently self-adhesive side (6) intended to be stuck to the packet (1), and a second layer (7), that has a removable self-adhesive side (8) intended to be stuck to the first layer (5).

4 Claims, 1 Drawing Sheet

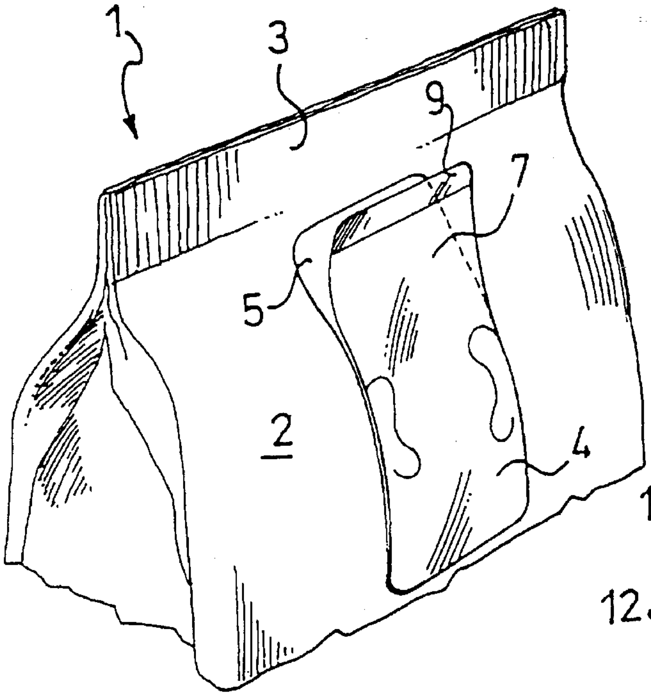
FIG.1
FIG.3
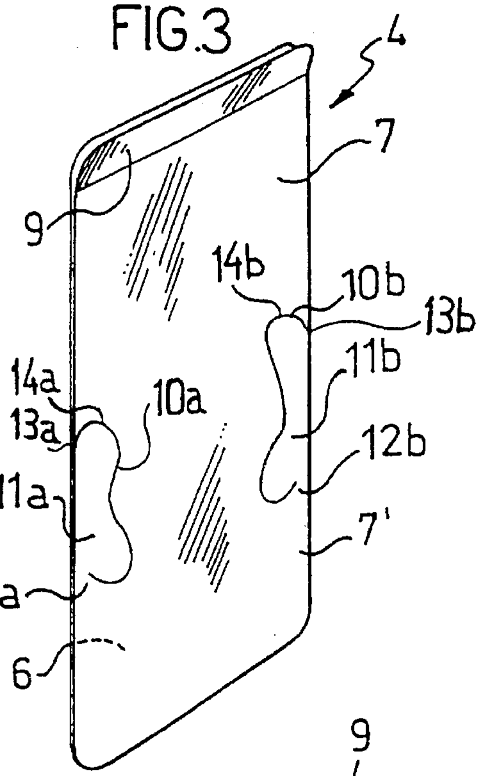
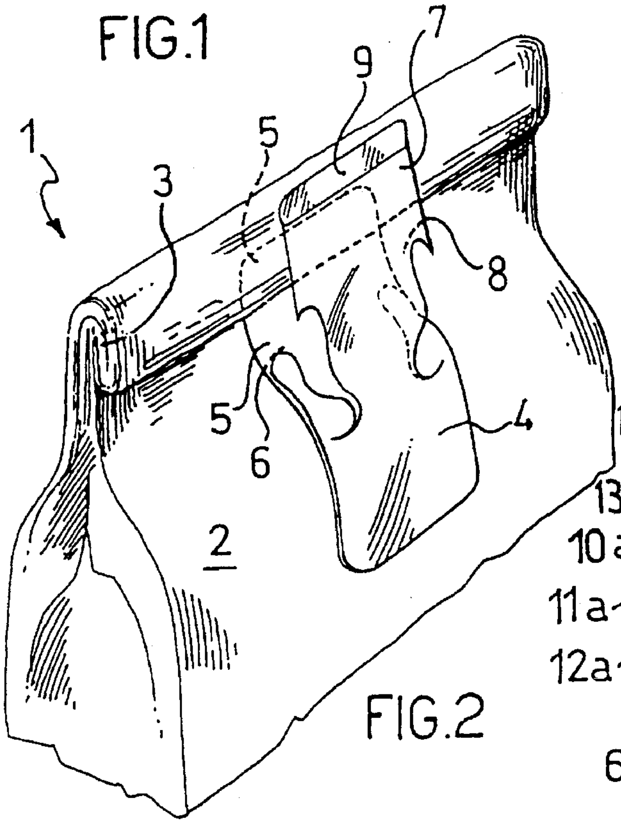
FIG.2
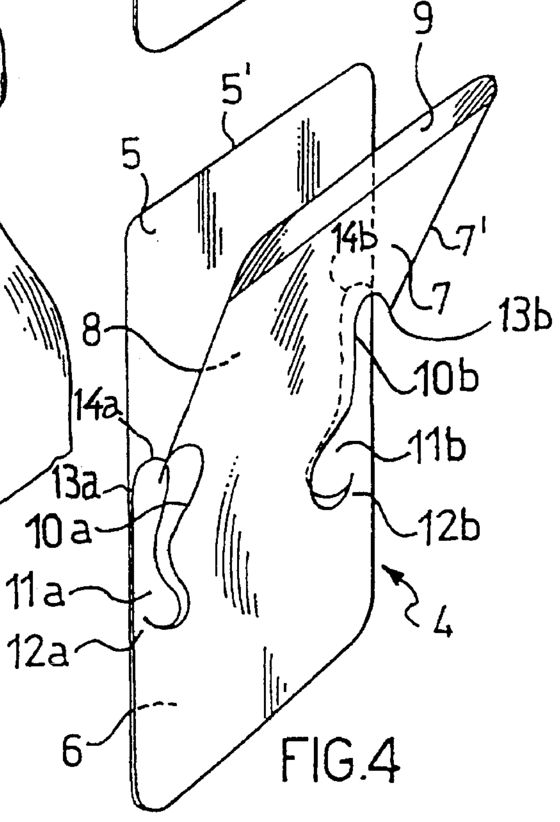
FIG.4

SELF-ADHESIVE LABEL FOR RECLOSING PACKETS

BACKGROUND OF THE INVENTION

1. Field of the Invention

The present invention concerns a self-adhesive label of a type used for reclosable packages, in particular bags.

2. Description of the Prior Art

Self-adhesive labels of the type specified are typically used for reclosable packets of food products, for example baked products such as biscuits and the like, where the contents are not all consumed at one time. Until the contents are completely exhausted, therefore, the packet must be reclosable with the same label, protecting the food product from the air, odours etc, in order to maintain unaltered its physical and organoleptic properties.

The said self-adhesive labels are not used for closing such packets before they have been opened by the consumer for the first time. This closure is achieved by a non-reusable means while the self-adhesive label is attached to the packet but has no active function.

Following initial opening, the self-adhesive label can be used for releasably reclosing the packet.

For the greatest convenience of the consumer, the already attached self-adhesive label of the type specified can be removably adhesively fixed to the packet in a suitable position to effect the reclosure.

In this case, however, the self-adhesive releasable adhesive must be chosen carefully with respect to the type of surface of the packet, usually paper.

Certain adhesives can however be too sticky with the result that when the self-adhesive label is removed from the packet, it may be torn rendering the label unusable for its purpose.

The choice of particular self-adhesive adhesives according to the type of packet to be reclosed, makes industrial mass-production processes complex, and therefore costly.

SUMMARY OF THE INVENTION

The technical problem on which the present invention is based is to devise a self-adhesive label which allows the cited problem of the prior art to be overcome.

This problem is resolved by a self-adhesive label of the type specified, characterised by the fact that it comprises a first layer which has a permanently self-adhesive side intended to be stuck to the packet, and a second layer which has a releasable self-adhesive side intended to be stuck to the first layer.

The principal advantage of the self-adhesive label according to the invention lies in the fact that the label is usable on all packets of the specified type whatever type of paper surface it has.

Further characteristics and advantages of the self-adhesive label according to the invention will become apparent from the detailed description of a preferred embodiment, given by way of non-limitative example, applied to a reclosable packet in the form of a bag for baked products, with reference to the accompanying drawings.

BRIEF DESCRIPTION OF THE DRAWINGS

FIG. 1 is a perspective view of a packet to be reclosed with a self-adhesive label according to the invention attached.

FIG. 2 is a perspective view of the packet in FIG. 1 reclosed with the self-adhesive label according to the invention.

FIG. 3 is an enlarged perspective view of a self-adhesive label according to the invention with the first and second layers adhering to each other.

FIG. 4 is a perspective view of the self-adhesive label of FIG. 3 with the first and second layers partially separated.

DESCRIPTION OF THE PREFERRED EMBODIMENT

In the drawings a reclosable packet in the form of a bag for baked products such as biscuits and the like, is indicated 1. This has an outer surface 2 of paper, and a border portion 3. To gain access to the product in the packet it may be necessary to cut the packet 1 with a pair of scissors close to the border portion 3 and parallel to it.

On the outer surface 2, near to the border portion 3, the packet 1 has a self-adhesive label 4 according to the present invention.

It comprises a first layer 5, with an edge 5', which has an entirely coated, permanently self-adhesive side 6 which, in use, is adhered to the outer surface 2 of the packet to be reclosed 1. The said first layer 5, in a preferred embodiment, is of an elongate rectangular shape and is positioned perpendicular to the border portion 3.

The self-adhesive label 4 further includes a second layer 7, with an edge 7', having the same shape and dimensions as the first layer 5, and having a releasable self-adhesive side 8. The second layer 7 is adhered to the first layer 5 so as to be superimposed perfectly with the edges 5' and 7' coinciding.

In a preferred embodiment of the invention, the releasable self-adhesive side 8 of the second layer 7 is partially coated with adhesive so as to define a flap 9, which facilitates the gripping of the second layer 7 at that edge of the self-adhesive label 4 facing the border portion 3.

Close to the other edge, however, the second layer has two incision lines **10*a* and 10*b*, which are symmetrical about the longitudinal axis of the label 4 and which start from respective points 13*a*, 13*b* on the long sides 7' of the second layer 7, delimiting two retaining portions, 11*a* and 11*b* respectively, of the second layer 7**.

In a preferred embodiment of the invention each incision line **10*a*, 10*b*, starting from the points 13*a*, 13*b*, describes a curve which is convex towards the flap 9 and has a respective apex 14*a*, 14*b*, from which the curve turns in an opposite direction to the starting direction and has a portion substantially parallel to the long side passing the respective points 13*a*, 13*b* of the edge 7' and terminating in a further portion extending towards the edge 7' and with a respective free end 12*a*, 12*b* spaced from the edge 7' of the second layer 7**.

The said retaining portions **11*a*, 11*b* constitute means for limiting the removable separation of the first layer 5 from the second layer 7, as will be more clearly seen from the description of the functioning of the self-adhesive label 4**.

Similarly, the apices **14*a*, 14*b* constitute the point of first separation between the retaining portions 11*a*, 11*b* and the second layer 7**.

When the packet 1 is opened for the first time and its contents are not entirely consumed, it is necessary to reclose the packet 1 to safeguard the baked products which degrade rapidly on exposure to the open.

To this end it suffices to refold the border portion 3 down on itself (FIG. 2), remove, the second layer 7 from the first layer 5, by gripping the flap, and place it over the border portion 3 in such a way that it remains refolded, thereby closing the packet 1.

The retaining portions 11*a*, 11*b* are present to prevent the second layer 7 detaching itself completely from the first layer 5.

The retaining portions 11*a*, 11*b* do not in fact participate in the removal of the second layer 7 (FIG. 2 and 4) because they are delimited by the incision lines 10*a*, 10*b* which stop the force of removal as applied to the flap 9 acting on the portions 11*a*, 11*b*.

These portions remain adhered to the first layer 5 while the remaining part of the second layer 7 lifts up along the incision lines 10*a*, 10*b*. The lifting is interrupted, however, by the free ends 12*a*, 12*b* because from this point on, the force of removal is opposed by a reaction due to the adherence of the portions 11*a* and 11*b* to the first layer 5.

The separation of the second layer 7 during its lifting from the retaining portions 11*a*, 11*b* starts at the points of first separation 14*a*, 14*b* that are those points on the incision lines 10*a*, 10*b* closest to the flap 9 and that are spaced at a predetermined distance from the edge 7' of the second layer 7, so that this separation doesn't start from a point on the edge 7' with the risk of tearing the second layer 7 along a random line.

Besides the above-mentioned advantage, the self-adhesive label 4 according to the invention is structurally simple, inexpensive and adapted to industrial mass-production.

In addition, it can be adapted to be applied mechanically to packets to be reclosed.

Furthermore, the label is applicable to a wide range of packets to be reclosed after opening.

The presence of the points of first separation between the second layer and the retaining portions, in a position that is part of the second layer and far from its edge, ensures that the removal occurs properly and the retaining portions grip better.

For the self-adhesive label to reclose packets according to the invention, an expert in the field, in order to satisfy specific, contingent requirements, can introduce numerous variations, all being within the boundaries of protection of the invention, as defined by the following claims.

What is claimed is:

1. A self-adhesive label for reclosable packets comprising:

a first layer having a permanently self-adhesive side for adherence to the packet;

a second layer having a removably self-adhesive side and an end flap, said removably self-adhesive side adhering said second layer to said first layer; and stop means for limiting the removal of said second layer from said first layer, said stop means comprising at least one retaining portion formed from said second layer by an incision line in said second layer, said incision line describing a convex curve with at least one apex which defines a point of first separation between said second layer and said retaining portion with respect to said end flap.

2. The self-adhesive label of claim 1 wherein said second layer is delimited by an edge, said incision line extending from a point on said edge.

3. The self-adhesive label of claim 2 wherein said stop means comprises a pair of retaining portions, respectively formed by incision lines which are symmetrical about a longitudinal axis of the label.

4. The self-adhesive label of claim 1 wherein said at least one retaining portion is placed close to an opposite end with respect to said end flap.

* * * * *